(12) United States Patent
Elwart et al.

(10) Patent No.: US 8,972,103 B2
(45) Date of Patent: Mar. 3, 2015

(54) METHOD OF BUILDING AND USING LOCAL MAP OF VEHICLE DRIVE PATH

(71) Applicant: Ford Global Technologies, LLC, Dearborn, MI (US)

(72) Inventors: Shane S. Elwart, Ypsilanti, MI (US); Thomas Edward Pilutti, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/846,969

(22) Filed: Mar. 19, 2013

(65) Prior Publication Data

US 2014/0288765 A1    Sep. 25, 2014

(51) Int. Cl.
*G01M 17/00* (2006.01)
*G01S 19/38* (2010.01)
*G01S 1/00* (2006.01)
*G01C 21/00* (2006.01)

(52) U.S. Cl.
CPC .................................... *G01C 21/00* (2013.01)
USPC ...................... 701/32.4; 342/357.21; 701/400

(58) Field of Classification Search
USPC ..................................................... 701/32.4, 1
See application file for complete search history.

(56) References Cited

U.S. PATENT DOCUMENTS

| | | | |
|---|---|---|---|
| 5,956,250 A * | 9/1999 | Gudat et al. | 701/26 |
| 6,012,002 A * | 1/2000 | Tapping et al. | 701/25 |
| 6,198,996 B1 * | 3/2001 | Berstis | 701/36 |
| 6,944,533 B2 | 9/2005 | Kozak et al. | |
| 7,991,549 B2 | 8/2011 | Kimita et al. | |
| 8,612,107 B2 * | 12/2013 | Malikopoulos | 701/59 |
| 8,626,568 B2 * | 1/2014 | Warkentin et al. | 705/7.38 |
| 8,676,466 B2 | 3/2014 | Mudalige | |
| 2002/0091473 A1 | 7/2002 | Gardner et al. | |
| 2005/0102098 A1 * | 5/2005 | Montealegre et al. | 701/209 |
| 2006/0271246 A1 * | 11/2006 | Bell et al. | 701/1 |
| 2010/0100310 A1 | 4/2010 | Eich et al. | |
| 2010/0256835 A1 | 10/2010 | Mudalige | |
| 2010/0256836 A1 | 10/2010 | Mudalige | |
| 2010/0256852 A1 | 10/2010 | Mudalige | |
| 2011/0166731 A1 | 7/2011 | Kristinsson et al. | |
| 2011/0184588 A1 | 7/2011 | Brusilovsky et al. | |
| 2012/0083960 A1 | 4/2012 | Zhu et al. | |
| 2012/0253605 A1 | 10/2012 | Denaro | |
| 2012/0265433 A1 | 10/2012 | Viola et al. | |
| 2012/0271544 A1 | 10/2012 | Hein et al. | |
| 2013/0231824 A1 * | 9/2013 | Wilson et al. | 701/26 |

FOREIGN PATENT DOCUMENTS

| | | |
|---|---|---|
| EP | 1111336 A1 | 6/2001 |
| EP | 1529695 A1 | 5/2005 |

\* cited by examiner

*Primary Examiner* — Thomas G Black
*Assistant Examiner* — Tyler D. Paige
(74) *Attorney, Agent, or Firm* — Frank A. MacKenzie; Bejin Bieneman PLC (57) ABSTRACT

An automotive vehicle mapping system is disclosed. The mapping system includes an on-vehicle electronic storage device, a GPS receiver, and an electronic controller. The electronic controller is configured to receive GPS data from the GPS receiver indicative of a current location of the vehicle. The electronic controller is also configured to store the GPS data on the electronic storage device if the location of the vehicle is outside of a location envelope.

24 Claims, 6 Drawing Sheets

METHOD OF BUILDING AND USING LOCAL MAP OF VEHICLE DRIVE PATH

BACKGROUND

GPS-based navigation systems for automotive vehicles, which provide drive route instructions from a starting location to a destination location are known. Further, GPS-based systems that enable a driver to preview information about an intended drive path, such as speed limits, curves, hills, and other characteristics of roads on a map are also are known. Such systems typically store or download a pre-determined set of data that relate to known roads that are most commonly driven by members of the general public. These data or "maps" are typically generated and provided by third-party vendors. Such systems are data intensive because they are mass produced for general consumers and typically include map data for a large number roads across a large geographic area, such as the entire United States, even though any individual driver is unlikely to ever use most of the data in the system.

Known systems, once downloaded or purchased from a vendor, are typically "static", that is they provide the driver with a preview of roads known at the time the vendor acquired the map data. They do not adapt to changes in known roads or learn new roads that were not previously captured by the vendor. To address new and changing roads, vendors commonly provide periodic downloadable "updates" to the map data for purchase by the user of the system. However, such updates can be costly, inconvenient and untimely. Further, known systems are not customized for the particular driving habits and patterns of an individual driver. Accordingly, known systems are not useful in situations where a pre-determined map is not available (e.g., where the intended drive path is away from common public roads) or where the map vendor has not yet acquired or released updated data for a new road. Further, known systems do not interact with the automotive vehicle to adjust the driving characteristics of the vehicle in response to particular driving habits and patterns of an individual driver over time.

SUMMARY

An automotive vehicle mapping system is disclosed. The mapping system includes an on-vehicle electronic storage device, a GPS receiver, and an electronic controller. The electronic controller is configured to receive GPS data from said GPS receiver indicative of a current location of the vehicle. The electronic controller is also configured to store the GPS data on the electronic storage device if the location of the vehicle is outside of a location envelope.

DETAILED DESCRIPTION

A system and method of building and utilizing a localized and adaptive map of a vehicle drive path is disclosed. The system is located on the automotive vehicle itself, periodically receives location data for the vehicle from GPS satellites, and selectively stores some of the location data based upon certain criteria. Other characteristics about the physical route, as well as data related to the performance of the vehicle as it travels along the route, may also be locally stored in the system. In this way, map data and vehicle performance data associated with a particular route traveled by the vehicle can be stored locally with a relatively small amount of electronic storage space. The locally stored map and performance data may be specific to the vehicle recording the data or may be specific to selected drivers who drive the vehicle. The locally-stored map data is used on subsequent trips by the same vehicle to preview the intended travel path of the vehicle. The locally-stored performance data may be used on subsequent trips to adjust the performance of the vehicle as a function of the historical driving habits associated with the vehicle at associated locations along the route. The disclosed method is not dependent upon pre-defined maps and does not require a communication link to data outside of the vehicle (though it does not exclude the possible use or interaction with such pre-defined maps and/or communication links). Instead, the disclosed system acquires location data and vehicle performance data specific to the actual drive paths of the vehicle and uses such customized data on subsequent trips on the same drive path.

Figure 1:
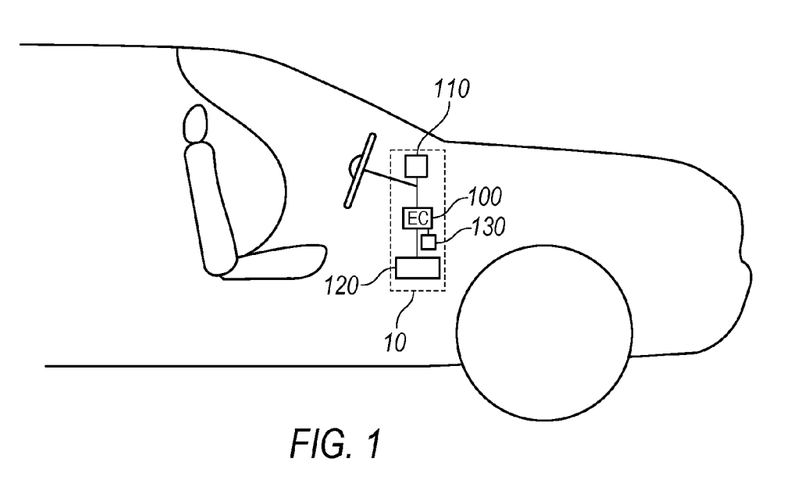
FIG. 1 is a conceptual illustration the components of a vehicle mapping system and an exemplary automotive vehicle environment in which such a mapping system may be employed.

FIG. 1 illustrates an exemplary automotive vehicle 10 in which a system of the type described herein may be employed. The automotive vehicle may include various sensors (not shown) to assess and control vehicle performance, which are known in the art. Further, the automotive vehicle includes the localized mapping system 10 described hereinafter. The localized mapping system 10 includes at least an electronic controller 100 that is communicatively-coupled to at least memory 110, a storage device 120 and a GPS receiver 130. The controller 100 receives data from the GPS receiver 130 and the various vehicle sensors. The controller uses that data to generate a learned map of routes traveled by the vehicle and to associate various data with the learned routes, employing the methods and algorithms described hereinbelow.

Figure 2:
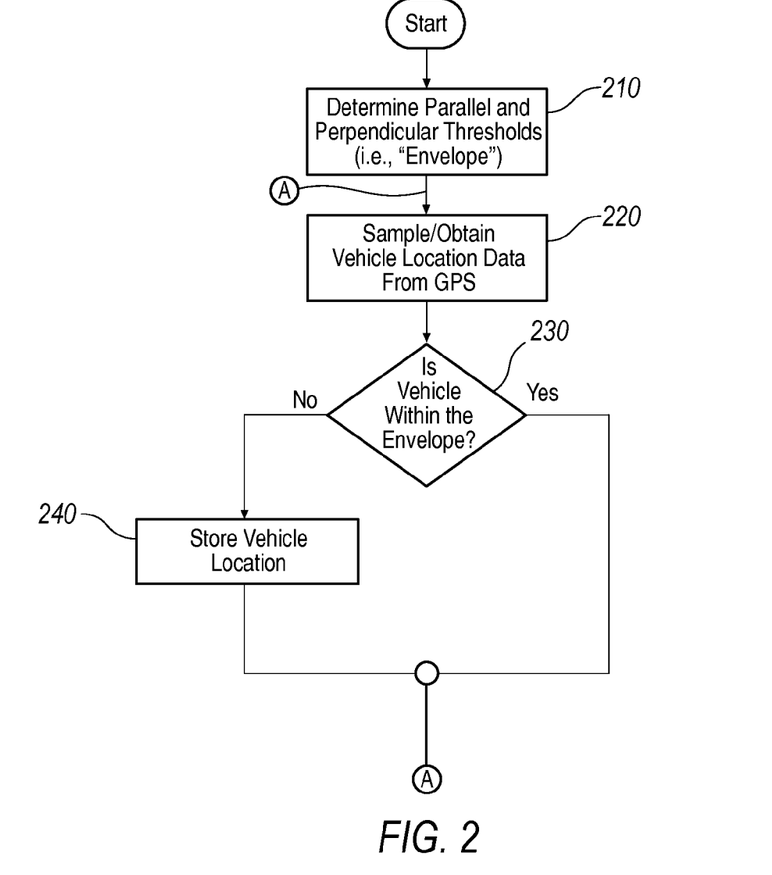
FIG. 2 is a flowchart illustrating exemplary steps in a method to selectively store location data to build a map of a traveled route.
Figure 3:
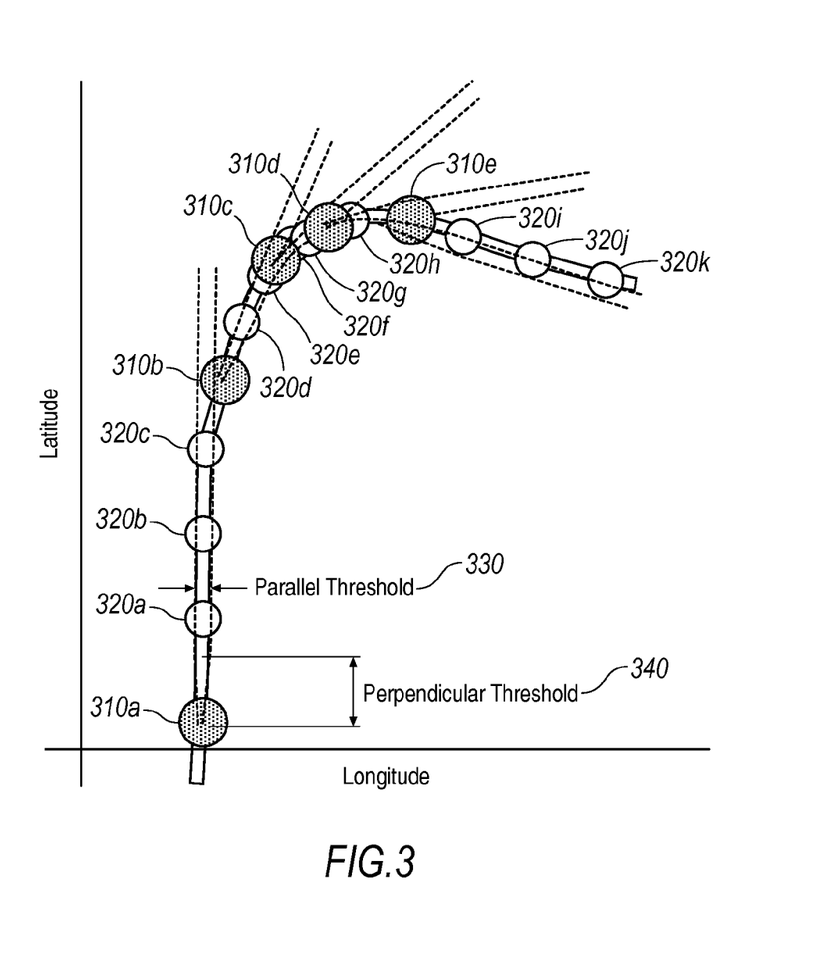
FIG. 3 is a conceptual illustration of the steps shown in the flowchart of FIG. 2.

FIG. 2 illustrates a flowchart setting out the basic functional steps of an algorithm stored in memory 110 and executed by the controller 100 to acquire location data and build a "map" of a new route being traveled in real-time by the automotive vehicle. FIG. 3 illustrates conceptually and graphically the method illustrated by the flowchart of FIG. 2. With reference to FIG. 3, successive geographic locations on the surface of the Earth are depicted by the circles shown on the Longitude/Latitude graph (altitude not shown). Both the larger solid circles 310a-310e and the smaller circles 320a-

320k depict points when the geographic location of the vehicle has been periodically sampled (i.e., longitude and latitude data for the location of the vehicle is acquired from GPS satellites). The longitude/latitude data associated with the larger solid circles 310a-320e are stored by the system on the storage device 120 for later retrieval and use by the system when the vehicle travels the same path in the future. The data associated with the smaller circles 320a-320k are discarded. The large circles 310a-310e are considered "location nodes", which are later used to identify and define a previously-traveled route by "linking" the location nodes 310a-310e together.

Location node 310a represents the first sampled location data of the vehicle on a new route. Accordingly, the system stores the location data associated with location node 310 as the "head" or starting point of the route. The system then periodically acquires or samples longitude and latitude data associated with the then-location of the vehicle received from GPS satellites by GPS receiver 130. The system makes a determination to store the currently-sampled location data as a location node (e.g., location nodes 310b-310e) when the sampled location data falls outside of an "envelope" defined by the combination of a parallel threshold and a perpendicular threshold.

The parallel threshold 330 is a distance between two imaginary parallel lines on opposite sides of the vehicle and between which the vehicle is centered. The direction of the parallel lines at any given moment is defined by the heading of the vehicle at that moment. For example, the parallel threshold 330 shown in FIG. 3 is shown as oriented in the vertical direction because the heading of the vehicle is in the vertical direction. The value of the parallel threshold 330 (the distance between the dashed lines) may be a pre-defined value or it may be a programmable variable value. The parallel threshold 330 may be virtually any value (e.g., the parallel threshold could be 4 feet, 6 feet, 10 feet, etc.). The perpendicular threshold 340 is a distance (pre-defined or variable) defined along the heading of the vehicle. For a vehicle traveling in the forward direction, the perpendicular threshold 340 typically starts at a stored location node and extends in front of the vehicle along the heading of the vehicle. For a vehicle traveling in the rearward direction, the perpendicular threshold 340 may start at a stored location node and extend rearward of the vehicle. The value of the perpendicular threshold could be virtually any distance, e.g., 10 feet, 15 feet, 20 feet, etc. Together, the parallel and perpendicular thresholds define an "envelope" around a traveling vehicle. Location data acquired when the vehicle is inside of the envelope (within the parallel and perpendicular thresholds) are discarded, which is illustrated in FIG. 3 as small circles 320a-k. However, when the vehicle goes outside of the envelope (the vehicle goes outside of the parallel or the perpendicular thresholds), then the system stores the current location data on storage device 120 as a location node 310. In this way, location data for the vehicle are stored as a location node 310 each time the vehicle veers from its current heading by a certain distance, which is detected by the vehicle location exceeding the parallel threshold 330. Location data for the vehicle are also stored as a location node 310 each time the vehicle travels along the same heading (within the parallel threshold) for a defined distance, which is detected by the vehicle location exceeding the perpendicular threshold 340. The stored location nodes 310a-310e are later used to define the path previously-traveled by this particular vehicle, which can be displayed to the driver on a display screen during a subsequent trip along the same route. The smaller the envelope (i.e., the larger the parallel threshold and/or the perpendicular threshold), the more location nodes 310 that will be stored and the finer the granularity or resolution of the map that will be generated. The larger the envelope, the more course the granularity or resolution of the map. Of course, finer granularity or resolution requires a greater amount of storage on storage device 120.

FIG. 2 illustrates steps that may be executed by controller 100 to acquire location data and build the map as described above in connection with FIG. 3. With reference to FIG. 2, the size of the envelope is determined, i.e., the parallel and perpendicular thresholds are determined at step 210. Then, at step 220, the system samples vehicle location data from GPS satellites. Then, at step 230, the controller 100 determines, based on the sampled vehicle location data, whether the vehicle is within the envelope. That is, the controller 100 determines if the vehicle is within the parallel threshold 330 and the perpendicular threshold 340. As indicated above, the values of the perpendicular and parallel thresholds may be pre-determined or variable. If the vehicle is within the envelope, then the algorithm loops back to step 220 and samples the location of the vehicle again periodically. If, on the other hand, the vehicle is not within the envelope (i.e., outside of the parallel or the perpendicular threshold), then (at step 240), the system stores the current vehicle location data (longitude and latitude data) as a location node 310 on the storage device 120. After storing the location node, the algorithm loops back to step 220 and samples the location of the vehicle again periodically. The frequency of the sampling may be pre-defined or variable. In this way, a set of location nodes 310 are stored for later retrieval, which can be linked together to define and display the stored route traveled by the vehicle.

The method described above in connection with FIGS. 2 and 3 illustrate a method of building a map of a route traveled by a vehicle in real time and storing it locally on the vehicle, without the need for a pre-defined map acquired from a vendor and without the need for a communication connection to a data source outside of the vehicle.

Figure 4:
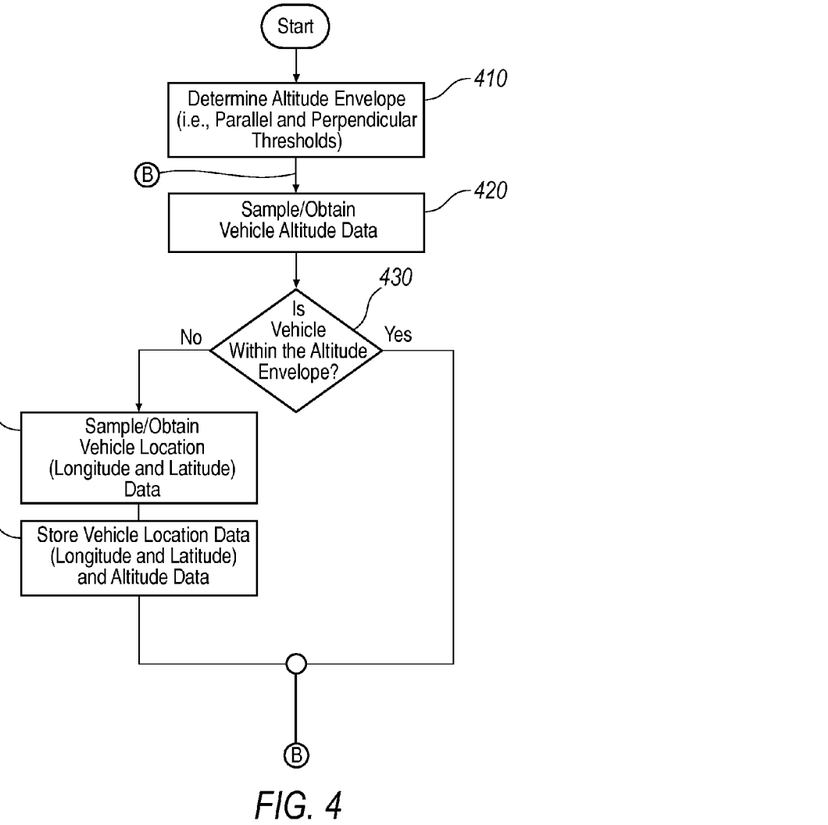
FIG. 4 is a flowchart illustrating exemplary steps in a method to selectively store altitude data to enhance a map of a traveled route.
Figure 5:
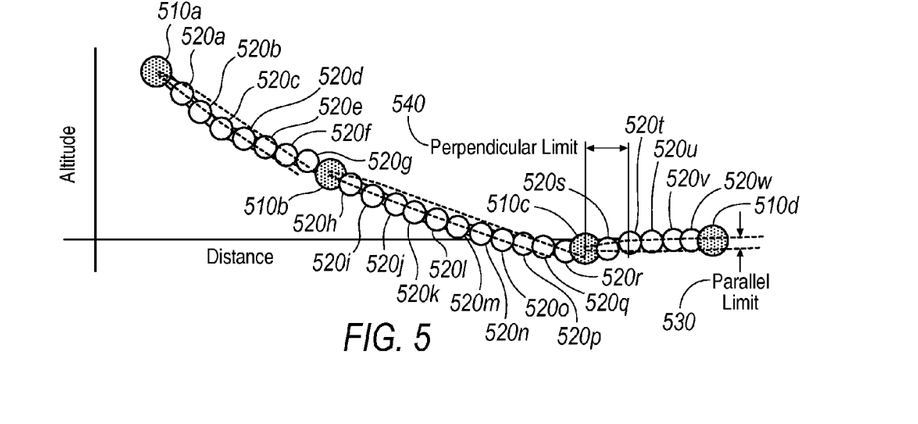
FIG. 5 is a conceptual illustration of the steps shown in the flowchart of FIG. 4.

The two-dimensional map of routes traveled by the vehicle described in connection with FIGS. 2 and 3 above can be enhanced by mapping other characteristics of the traveled route. For example, FIGS. 4 and 5 illustrate a method, consistent with the method described in connection with FIGS. 2 and 3, to store data associated with the altitude of the traveled path, which can later be retrieved by the system to preview to the driver and control systems within the vehicle, hills and other changes in surface altitude along the route. FIG. 5 illustrates conceptually and graphically the method of recording altitude data associated with the traveled route. Similar to the previously-described method, the system periodically samples altitude data for the current location of the vehicle from GPS satellites. The sampled altitude data is depicted in FIG. 5 as the large solid circles 510a-510d and the smaller circles 520a-520w. As above, an envelope around the vehicle is defined by a parallel threshold 530 and a perpendicular threshold 540, both of which may be pre-defined or variable. The perpendicular threshold 540 is a from a previous data sample along the heading of the vehicle. The parallel threshold 530 is a distance between two imaginary parallel lines that extend above and below the vehicle along the vehicle heading. When the system determines that the vehicle has gone outside of the envelope (by exceeding the parallel or the perpendicular threshold), the system stores the altitude data, along with geographic location data for the vehicle, as an "altitude node" 510a-510d on the storage device for later retrieval. The stored altitude nodes 510a-510d can be linked to create an altitude map to display the altitude changes along a previously-traveled route to a driver.

FIG. 4 is a flowchart that illustrates method steps that can be implemented by the controller 100 to build the altitude map described in connection with FIG. 5. At step 410, the system determines the altitude envelope, defined by the altitude parallel threshold 530 and the altitude perpendicular threshold 540. The parallel and perpendicular altitude thresholds can be pre-defined or variable and may be virtually any value. At step 420, altitude data for the vehicle is sampled from GPS satellites. At step 430, the controller 100 determines if the vehicle is within the altitude envelope, i.e., whether the vehicle is within the altitude parallel threshold 530 and within the altitude perpendicular threshold 540. If so, then the algorithm loops back to step 420 to sample the vehicle altitude data again periodically. The frequency with which the altitude data is sampled may be pre-defined or variable. If the vehicle is outside of the altitude envelope (i.e., outside of the altitude parallel threshold 530 or the altitude perpendicular threshold 540), then (at step 440) the system acquires geographic data for the vehicle from GPS satellites, which is associated with point at which the vehicle has gone outside of the altitude envelope. Then, at step 450, the system stores the altitude data and the geographic data together on the storage device 120 as a new "altitude node" 510a-510d. Then, the algorithm loops back to step 420 to sample the altitude data again periodically. These stored altitude nodes may be later retrieved and linked together to generate and preview to a driver the altitude changes (e.g., hills) along the traveled route when the vehicle travels the same route in the future.

Figure 6:
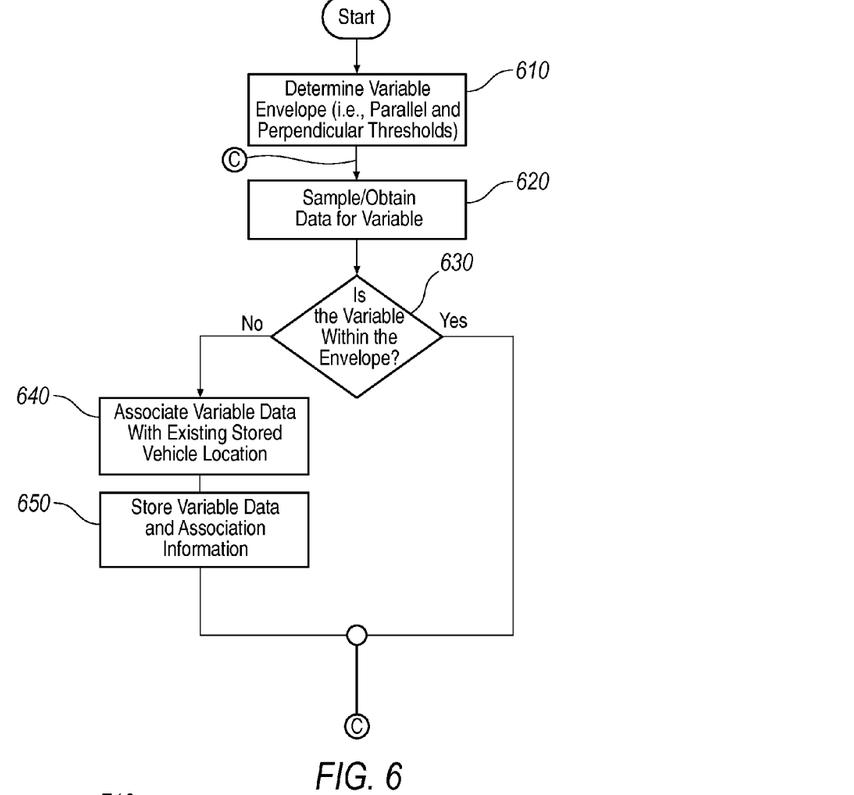
FIG. 6 is a flowchart illustrating exemplary steps in a method to selectively store data associated with a variable of interest that is associated with a traveled route.
Figure 7:
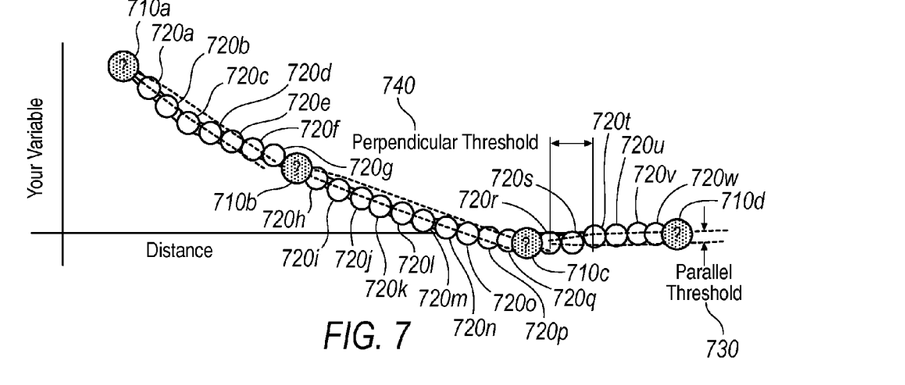
FIG. 7 is a conceptual illustration of the steps shown in the flowchart of FIG. 6.

The map generated by the method in FIGS. 2 and 3, whether or not enhanced with altitude data according to the method illustrated in FIGS. 4 and 5, can be further enhanced by associating and storing other data derived during the route traveled by the vehicle. For example, performance data derived from the vehicle, such as vehicle speed, yaw rate, acceleration levels, lane tracking, etc. may be associated and stored, which can later be used to control or adjust various vehicle systems, based on historical driving patterns, when the vehicle is driven on a route that has been previously "learned." Other data associated with the route may also be acquired. Collectively, data that is acquired and associated with a learned map is referred to as data associated with a "variable of interest." Such data is acquired from various known sensors and systems incorporated into the vehicle according to known methods. FIGS. 6 and 7 illustrate how any data associated with any desired variable of interest can be acquired, stored and associated with a map.

As shown in FIG. 7, data associated with a variable of interest is periodically sampled. Large solid circles 710a-710d and smaller circles 720a-720w collectively represent data samples of the variable of interest. As in the descriptions above related to FIGS. 2 and 3 and FIGS. 4 and 5, the system determines whether to store a particular data sample of the variable of interest based on whether the variable of interest has gone outside of an envelope, which is defined by a parallel threshold and a perpendicular threshold associated with the variable of interest. The parallel and perpendicular thresholds may be pre-defined or variable. Where the variable of interest is a performance characteristic of the vehicle, the parallel threshold represents a range for the particular performance characteristic and the perpendicular threshold represents a distance that the vehicle has traveled along the route. For example, if the performance characteristic or variable of interest is the vehicle speed, then the parallel threshold could be set at 10 mph and the perpendicular threshold could be set at 300 feet. If the sampled vehicle speed changes more than 5 mph in either direction (up or down), then the vehicle speed (variable of interest) would exceed the parallel threshold. In another scenario, where the vehicle maintains a relatively constant speed—not varying more than 5 mph in either direction—for a distance of longer than 300 feet, then the vehicle would exceed the perpendicular threshold. In either case, the vehicle would be outside of the envelope and the sampled data of the variable of interest would be stored as a node on the storage device 120.

Each stored variable of interest node 710 must be associated with a point on a learned route on the map. The association allows the stored variable of interest node to be later displayed to the vehicle driver at a particular point on the map when the vehicle is driven over the same route. One possible method of making that association is to acquire and store GPS location data associated with each variable of interest node 710, much in the same manner as the altitude nodes are stored and associated with GPS location data, as described in connection with FIGS. 4 and 5. As a way of minimizing the required storage space on storage device 120, though, an alternative method of associating the variable of interest nodes with locations on the learned map may be used. Instead of storing a new set of GPS location data for each variable of interest node, each variable of interest node can be associated with an existing location node on the learned map and an "offset", which may be efficient in terms of usage of storage space. For example, if vehicle speed goes outside of the speed envelope at a point on the route that is 75% of the distance between a first existing location node and a second existing location node on the route, then the new speed node can be stored and associated with a point on the stored route that is 75% of the distance between the first location node and the second location node.

In this way, data associated with a wide range of performance characteristics of the vehicle and/or other data associated with the physical route itself can be acquired, selectively stored, and associated with a previously-learned route in a storage-efficient manner so that they can later be retrieved and displayed and/or used to control vehicle systems when the vehicle travels the same route in the future.

FIG. 6 is a flowchart that illustrates steps that can be employed by the controller 100 to implement the method described above in connection with FIG. 7. At step 610, the system determines the envelope for the variable of interest. As previously described, the envelope is comprised of a parallel threshold and a perpendicular threshold, which may be pre-defined or variable. At step 620, the variable of interest is sampled. The sampling is accomplished through various sensors and other devices that are known in the art for acquiring data concerning vehicle performance and/or environmental conditions. At step 630, the controller 100 determines if the sampled variable of interest is within the envelope. If so, then the algorithm loops back to step 620 to sample the variable of interest periodically. If the sampled variable of interest is outside of the envelope, then, at step 640, the sampled variable of interest is associated with a location node on the learned map. The association can be made by acquiring from GPS satellites the location of the vehicle when the variable of interest goes outside of the envelope and storing both variable of interest and the location together as a new node. Alternatively, the variable of interest can be associated with an existing location node on the learned map using an "offset" value. At step 650, the sampled data for the variable of interest is stored along with its association to a particular location on the learned map. Then, the algorithm loops back to step 620 to sample the variable of interest periodically.

Once location nodes have been learned and stored, a map can be generated by linking the nodes together. Generally speaking, when the vehicle subsequently travels a previously-learned route, the system visually provides a preview of the route on a display screen. If other data (e.g., altitude data, performance data, etc.) have been stored and associated with points on the learned map, then that other data may be displayed to the driver as well to provide information concerning historical drive patterns over the course of the learned route. Further, the additional data, such as historical vehicle performance data, can be used to control or adjust the performance of the vehicle when the vehicle is subsequently driven on a previously-learned route.

Figure 8:
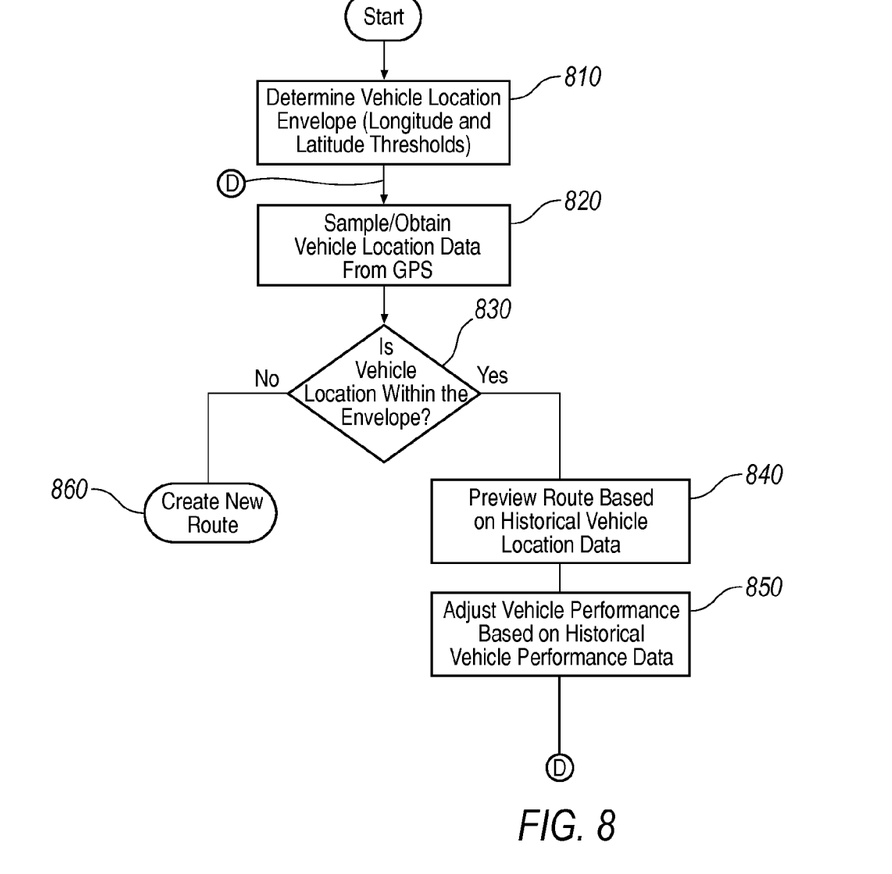
FIG. 8 is a flowchart illustrating exemplary steps in a method to match a currently-traveled route to a previously-stored route of the vehicle and to utilize data associated with the previously-stored route.

FIG. 8 is a flowchart that illustrates a method of using and displaying stored data associated with a previously-learned route. At step 810, a vehicle location matching envelope is determined, which, in this case, comprises a latitude threshold and a longitude threshold, which may be pre-defined or variable. The dimensions of the location matching envelope are independent of the dimensions of the earlier-described location envelope used for learning a route (described in connection with FIGS. 2 and 3). For purposes of this method, the location matching envelope is used to determine if the current location of the vehicle is sufficiently near an existing stored location node. That is, if the longitude and latitude data of the current location of the vehicle are within the latitude threshold and the longitude threshold (i.e., the location envelope) of a previously-learned location node, then the system matches the current location to the previously-learned location node. To that end, at step 820, the system samples the vehicle location by receiving location data from GPS satellites. At step 830, the controller 100 determines if the sampled current vehicle location is within the location envelope, i.e., within the latitude threshold and the longitude threshold, of a previously-learned location node. If so, then, at step 840, the system displays the previously-learned route or link between the matched location node and the next location node on the previously-learned route. Further, other previously-learned data, such as altitude data and vehicle performance data associated with the location node may be displayed to the driver. Further, at step 850, previously-learned vehicle performance data that is associated with the current location node on the route may be used to control or adjust vehicle systems. The algorithm then loops back to step 820 to periodically sample the current vehicle location from the GPS satellites. If and when the current vehicle location goes outside of the envelope (i.e., the latitude threshold or the longitude threshold is exceeded), then it is determined that the vehicle has strayed from the previously-learned route and the system begins to learn a new route, using the method and steps described in connection with FIGS. 2 and 3.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An automotive vehicle mapping system, comprising:
an on-vehicle electronic storage device;
a GPS receiver; and
an electronic controller, communicatively coupled to the electronic storage device and the GPS receiver, said controller configured to:
periodically sample GPS data from said GPS receiver indicative of a current location of the vehicle;
determine, from the sampled GPS data, whether the vehicle is within a location envelope; and
store the sampled GPS data on the electronic storage device if the location of the vehicle is outside the location envelope and discard the sampled GPS data if the vehicle is within the location envelope.

2. The automotive vehicle mapping system of claim 1, wherein said location envelope comprises:
a parallel threshold, which is a value that defines a distance between two imaginary parallel lines centered around opposite sides of the vehicle and aligned with the heading of the vehicle; and
a perpendicular threshold, which is a value that defines a distance along the heading of the vehicle.

3. The automotive vehicle mapping system of claim 1, wherein said parallel threshold and said perpendicular threshold are pre-determined.

4. The automotive vehicle mapping system of claim 1, wherein said parallel threshold and said perpendicular threshold are variable.

5. The automotive vehicle mapping system of claim 1, wherein said controller is further configured to generate a route map of a previously-traveled route by linking previously-stored GPS data associated with the previously-traveled route.

6. The automotive vehicle mapping system of claim 5, wherein said controller is further configured to match a currently-traveled route of the vehicle to a previously-traveled route of the vehicle.

7. The automotive vehicle mapping system of claim 6, wherein said controller is configured to match a currently-traveled route of the vehicle to a previously-traveled route of the vehicle by:
(i) receiving GPS location data indicative of a current location of the vehicle; and
(ii) determining if the current location of the vehicle is within a location matching envelope relative to previously-stored GPS location data.

8. The automotive vehicle mapping system of claim 7, wherein said location matching envelope comprises a longitude threshold and a latitude threshold.

9. The automotive vehicle mapping system of claim 8, wherein said controller is further configured to display previously-stored route data if said currently-traveled route is matched to a previously-traveled route.

10. The automotive vehicle mapping system of claim 1, wherein said controller is further configured to:
    receive GPS data from said GPS receiver indicative of an altitude associated with a current location of the vehicle; and
    store the GPS altitude data on the electronic storage device if the altitude of the vehicle is outside of an altitude envelope.

11. The automotive vehicle mapping system of claim 10, wherein said controller is further configured to:
    receive performance data associated with a performance variable of the vehicle; and
    associate the performance data with stored GPS location data corresponding to a point along a previously-traveled route and store said performance data if said performance data is outside of a performance data envelope.

12. The automotive vehicle mapping system of claim 10, wherein said altitude envelope comprises:
    a parallel threshold, which is a value that defines a distance between two imaginary parallel lines that center the vehicle from above and below and that are aligned with the heading of the vehicle; and
    a perpendicular threshold, which is a value that defines a distance along the heading of the vehicle.

13. The automotive vehicle mapping system of claim 11, wherein said vehicle is configured to adjust the performance of a vehicle system based upon previously-stored performance data associated with a previously-stored route that matches the currently-traveled route of the vehicle.

14. A method of generating an on-vehicle map of a previously-traveled route, the method comprising:
    sampling GPS data from a GPS satellite indicative of a current location of the vehicle;
    determining, from the sampled GPS data, whether the vehicle is within a location envelope; and
    storing said sampled GPS data on an on-vehicle electronic storage device if the location of the vehicle is outside of a location envelope and discarding the sampled GPS data if the vehicle is within the location envelope.

15. The method of claim 14, wherein said location envelope comprises:
    a parallel threshold, which is a value that defines a distance between two imaginary parallel lines centered around opposite sides of the vehicle and aligned with the heading of the vehicle; and
    a perpendicular threshold, which is a value that defines a distance along the heading of the vehicle.

16. The method of claim 15, further comprising the step of generating a route map of a previously-traveled route by linking previously-stored GPS data associated with the previously-traveled route.

17. The method of claim 14, further comprising the step of matching a currently-traveled route of the vehicle to a previously-traveled route of the vehicle.

18. The method of claim 17, wherein the matching step comprises the steps:
    receiving GPS location data indicative of a current location of the vehicle; and
    determining if the current location of the vehicle is within a location matching envelope relative to previously-stored GPS location data.

19. The method of claim 18, wherein said location matching envelope comprises a longitude threshold and a latitude threshold.

20. The method of claim 19, further comprising the step of displaying previously-stored route data if said currently-traveled route is matched to a previously-traveled route.

21. The method of claim 14, further comprising the steps:
    receiving GPS data from said GPS receiver indicative of an altitude associated with a current location of the vehicle; and
    storing the GPS altitude data on the electronic storage device if the altitude of the vehicle is outside of an altitude envelope.

22. The method of claim 21, further comprising the steps:
    receiving performance data associated with a performance variable of the vehicle; and
    associating the performance data with stored GPS location data corresponding to a point along a previously-traveled route and store said performance data if said performance data is outside of a performance data envelope.

23. The method of claim 21, wherein said altitude envelope comprises:
    a parallel threshold, which is a value that defines a distance between two imaginary parallel lines that center the vehicle from above and below and that are aligned with the heading of the vehicle; and
    a perpendicular threshold, which is a value that defines a distance along the heading of the vehicle.

24. The method of claim 22, further comprising the step of adjusting the performance of a vehicle system based upon previously-stored performance data associated with a previously-stored route that matches the currently-traveled route of the vehicle.

* * * * *